(12) United States Patent
Sodore et al.

(10) Patent No.: US 10,293,525 B2
(45) Date of Patent: May 21, 2019

(54) METHOD AND SYSTEM FOR PRODUCING A THREADED BOLT

(71) Applicant: Bishop GmbH, Hamburg (DE)

(72) Inventors: Oumarou Sodore, Hamburg (DE); Peter Bishop, Hamburg (DE)

(73) Assignee: Bishop GmbH, Hamburg (DE)

( * ) Notice: Subject to any disclaimer, the term of this patent is extended or adjusted under 35 U.S.C. 154(b) by 183 days.

(21) Appl. No.: 15/143,823

(22) Filed: May 2, 2016

(65) Prior Publication Data

US 2017/0312948 A1    Nov. 2, 2017

(51) Int. Cl.
| | |
|---|---|
| B29C 43/02 | (2006.01) |
| F16B 35/00 | (2006.01) |
| B29C 43/16 | (2006.01) |
| B29K 71/00 | (2006.01) |
| B29K 105/00 | (2006.01) |
| B29L 1/00 | (2006.01) |

(52) U.S. Cl.
CPC ............ *B29C 43/021* (2013.01); *B29C 43/16* (2013.01); *F16B 35/00* (2013.01); *B29C 2043/024* (2013.01); *B29K 2071/00* (2013.01); *B29K 2105/253* (2013.01); *B29L 2001/002* (2013.01)

(58) Field of Classification Search
CPC ........ B29C 43/021; B29C 43/16; F16B 35/00
See application file for complete search history.

(56) References Cited

U.S. PATENT DOCUMENTS

| | | | | |
|---|---|---|---|---|
| 5,209,888 | A | * | 5/1993 | Shimada ............... B29C 43/021 264/250 |
| 2007/0182065 | A1 | * | 8/2007 | Adams .................. B29C 43/027 264/322 |

FOREIGN PATENT DOCUMENTS

| | | | | |
|---|---|---|---|---|
| JP | 06114859 | A | * 4/1994 | ........... B29C 43/021 |
| JP | 2007136460 | A | * 6/2007 | |

OTHER PUBLICATIONS

Martin Paul Ducote, Jr., "Characterization of Composites Fabricated From Discontinuous Random Carbon Fiber Thermoplaetic Matrix Sheets Produced by a Paper Making Process," Master's Thesis, 2015 (Year: 2015).*

* cited by examiner

*Primary Examiner* — Jacob T Minskey
*Assistant Examiner* — Melody Tsui
(74) *Attorney, Agent, or Firm* — Alix, Yale & Ristas, LLP

(57) ABSTRACT

The invention relates to a method for producing a threaded bolt. A blank is introduced into a threaded-bolt negative mold. The blank has a bolt-shaped portion. Fibers which are aligned in the longitudinal direction of the bolt-shaped portion are embedded in a plastics material in the blank. Pressure is exerted on the blank in order to deform the blank in the negative mold such that a threaded structure is formed on a circumferential face of the bolt-shaped portion. The invention moreover relates to a threaded bolt which is manufacturable by this method, and to a system which is conceived for carrying out the method. Lightweight and hard-wearing threaded bolts may be manufactured by the method according to the invention.

12 Claims, 2 Drawing Sheets

METHOD AND SYSTEM FOR PRODUCING A THREADED BOLT

BACKGROUND

The invention relates to a method and to a system for producing a threaded bolt. The invention moreover relates to a threaded bolt which is producible in this manner.

Threaded bolts are used in establishing screw connections. Modern threaded bolts are predominantly composed of steel. The threaded structure on the circumferential face of the bolt is produced by a material-forming process. A plurality of established forming methods which enable threaded structures to be produced exist. These forming methods cannot be directly applied to other materials.

Threaded bolts of steel have a high weight, constituting a disadvantage in many types of applications.

SUMMARY

The invention is based on the object of proposing a method and a system for producing a threaded bolt, and a respective threaded bolt, the threaded bolt having a reduced weight. Proceeding from the mentioned prior art, the object is achieved by the features of claim 1. Advantageous embodiments are stated in the dependent claims.

In the method according to the invention, a blank is introduced into a threaded-bolt negative mold, which defines a cavity in the form of the threaded both to be produced. The blank has a bolt-shaped portion, which is cylindrical. Fibers which are aligned in the longitudinal direction of the bolt-shaped cylindrical portion are embedded in a plastics material in the blank. Pressure is exerted on the blank in order to deform the blank in the mold cavity such that a threaded structure is formed on a circumferential face of the bolt-shaped portion.

The fibers and the plastics material in the blank have a lower density than steel, a threaded bolt being produced in this manner thus having a lower weight. However, it has been demonstrated that it is not an entirely simple matter for a threaded structure to be produced on the circumferential face of the bolt-shaped portion of such a blank.

The invention has recognized that the plastics material may be reduced to a fluid state by the pressure which is exerted in the method according to the invention. This enables the blank to be deformed without the fibers being severed. On account thereof, the threaded structure of the threaded bolt is imparted high strength.

If the fibers are aligned in the longitudinal direction of the bolt-shaped cylindrical portion, the fibers have a preferred direction which is parallel to said longitudinal direction. An alignment in which the fibers are exactly parallel with one another typically cannot be achieved in most cases in practice. The blank may be composed of the plastics material and of the embedded fibers. The fibers are preferably carbon fibers.

The plastics material is selected such that it has sufficient fluidity when under pressure. Fluidity may be present at room temperature. Preferably, a material having fluidity which improves as the temperature increases is selected. In one preferred embodiment the plastics material is a thermoplastic plastics material. The plastics material may be polyetheretherkatone (PEEK), for example.

Deformation of the blank is preferably carried out at an increased temperature. The blank may already have an increased temperature when it is introduced into the negative mold. Additionally or alternatively, the blank may be (further) heated once it has been introduced into the negative mold.

The temperature at which the blank is introduced into the negative mold depends on the type of the plastics material. For example, in the case of a thermoplastic material a temperature which is lower than the melting temperature but is not more than 20%, preferably not more than 10% below the melting temperature, may be selected. Alternatively stated, the temperature at which the blank is introduced to the mold is at least 80%, preferably at least 90% of the melting temperature. The percentage values each relate to the numerical values expressed in degrees Celsius. If the material is PEEK the temperature may be between 280° C. and 340° C., for example. Preferably, the blank is heated together with an insert piece, prior to being introduced into the threaded-bolt negative mold. The blank together with the insert piece may be made to engage with the molding tool in which the threaded-bolt negative mold is configured.

The temperature of the molding tool in which the negative mold is configured is preferably higher than the melting temperature of the plastics material. The molding tool may be elevated to the increased temperature once the blank has been introduced into the negative mold. Preferably, the molding tool already has the increased temperature when the blank is introduced. The temperature of the molding tool may be between 10% and 30% higher than the melting temperature of the plastics material, for example. If the plastics material is PEEK, the temperature may be between 380° C. and 420° C., for example.

The method is preferably carried out such that the plastics material of the blank is not completely but only partially heated beyond the melting temperature. It is desirable for the original material structure to be preserved as far as possible and for fluidity to be increased only in the external region.

A heating period may be observed once the blank has been introduced into the negative mold and prior to the pressure required for deformation being exerted. The heating period is preferably chosen such that in terms of the diameter at least 10% of the bolt-shaped portion is heated beyond the melting temperature of the plastics material, while the temperature in the core of the bolt-shaped portion remains below the melting temperature. For example, the heating period may last between 15 seconds and 60 seconds, preferably between 20 seconds and 30 seconds.

The molding tool with the negative mold of the threaded bolt is preferably designed such that introducing the blank is performed in the longitudinal direction of the bolt-shaped portion. The pressure at which the blank is deformed preferably likewise acts in the longitudinal direction of the bolt-shaped portion. The pressure which is exerted on the blank may be between 150 MPa and 400 MPa, for example, preferably between 200 MPa and 300 MPa.

The molding tool may have an end face, the blank being spaced therefrom upon commencement of the forming procedure, and the blank bearing thereon upon completion of the forming procedure. A cylindrical portion of the negative mold may adjoin the end face of the molding tool. The diameter of the cylindrical portion is preferably smaller than the diameter of the bolt-shaped portion of the blank. The blank may thus penetrate into the cylindrical portion only when deformed. The expansion of the blank in the radial direction may be supported in this manner such that the material of the blank penetrates into the threaded structure of the negative mold.

The bolt-shaped portion of the blank preferably forms the front end of the blank (in terms of the introduction direction into the negative mold). The diameter of the bolt-shaped portion is preferably somewhat smaller than the threaded structure of the negative mold such that the blank may be inserted into the molding tool without colliding with the threaded structure. A waiting period until the temperature of the molding tool lies below the melting temperature of the plastics material is preferably observed prior to the threaded bolt being removed from the molding tool. In one preferred embodiment the molding tool is cooled prior to the threaded bolt being removed. For this purpose, the molding tool may comprise a cooling installation. Ducts through which compressed air may be routed may be configured in the cooling installation.

The threaded bolt manufactured by the method according to the invention preferably has a head. The term head refers to a portion of the threaded bolt of which the diameter is larger than the diameter of the bolt-shaped portion, or of the threaded structure, respectively. The head may already be configured on the blank. Preferably, the blank does not yet have a head, but the head is molded only in conjunction with the method according to the invention. The blank then may have an overall cylindrical shape. The head may be produced by exerting pressure on the rear end face of the blank, or of the threaded bolt, respectively. Preferably, the head is produced in a subsequent step once the threaded structure has already been molded.

During the forming procedure, the material from which the head is molded preferably has a temperature which is above the melting temperature of the plastics material. The material is preferably heated in that a die bears on the end face, said die having a temperature above the melting temperature of the plastics material. The heat is well conducted within the material by way of the fibers embedded in the plastics material such that a portion of the blank that is sufficiently large for producing the head may be deformed. The axial depth to which the plastics material during molding of the head is heated beyond the melting temperature is preferably larger than the radial depth to which the plastics material during molding of the threaded bolt is heated beyond the melting temperature. The axial depth is preferably larger than the radial depth by at least a factor of 2, preferably by a factor of 5.

The temperature of the die during molding of the head is preferably higher than the temperature of the molding tool during molding of the threaded structure. If the plastics material is PEEK, the temperature of the die may be between 400° C. and 450° C., for example.

An insert piece which during production of the threaded structure fills that region in which the head is later produced is preferably provided for the molding tool. On account thereof, it becomes possible for only the threaded structure to be initially formed, without the rear portion of the blank being deformed. The insert piece is removed in order for the head to be formed, making available the space required for manufacturing the head. The insert piece may taper off in a conical manner toward the front end so that a head of the type of a countersunk head screw may be formed.

The invention moreover relates to a system which is suitable for carrying out the method according to the invention. The system comprises a molding tool in which a threaded-bolt negative mold is configured. The system moreover comprises a die which is conceived for exerting pressure on a blank which has been introduced into the negative mold, in order to deform the blank in the negative mold such that a threaded structure is formed on a circumferential face of a bolt-shaped portion of the blank.

The threaded-bolt negative mold in the molding tool preferably extends from an entry opening to an end face. A cylindrical portion may adjoin to the end face, the diameter of said cylindrical portion being smaller than the diameter of the threaded structure, preferably being smaller by at least 5%, more preferably being smaller by at least 10%, furthermore preferably being smaller by at least 20%. The threaded structure of the negative mold is preferably disposed between the cylindrical portion and a head portion. In the head portion, proceeding from the entry opening, the negative mold may be constricted in a conical manner in the direction of the end face.

Preferably, the molding tool is conceived for demolding in the radial direction. The molding tool may be provided with a heating installation. The heating installation is preferably conceived such that the molding tool may be heated to a temperature between 350° C. and 450° C. The molding tool may moreover be provided with a cooling installation. The cooling installation may in particular have compressed-air ducts.

The system may comprise a first die which is conceived for exerting the pressure required for forming the threaded structure on the blank. The system may comprise a second die which is conceived for exerting the pressure required for forming the head of the threaded bolt on the blank. The second die may be provided with a heating installation.

The invention moreover relates to a threaded bolt which is manufacturable by such a method.

The system may be refined with further features which are described in the context of the method according to the invention. The method may be refined with further features which are described in the context of the system according to the invention.

BRIEF DESCRIPTION OF THE DRAWINGS

The invention will be described hereunder in an exemplary manner with reference to the appended drawings and by means of advantageous embodiments. In the drawings.

DETAILED DESCRIPTION

Figure 1:
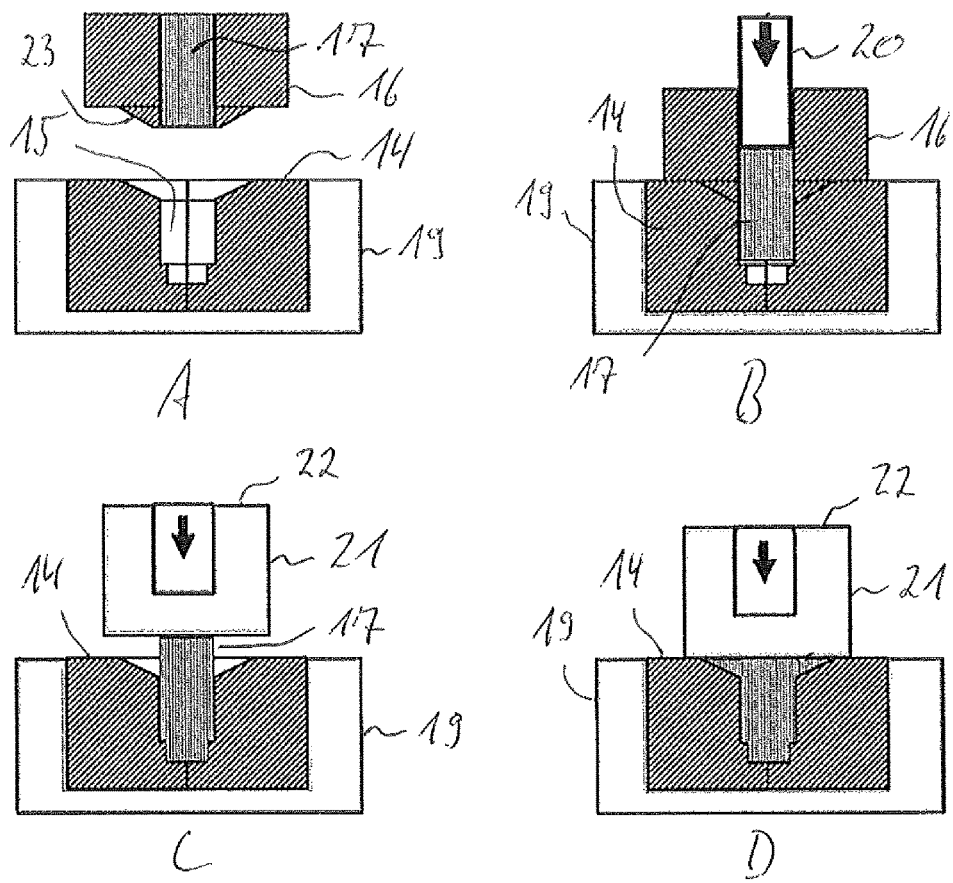
FIG. 1 shows a schematic illustration of a system according to the invention, in various states A to D.

In FIG. 1, a system according to the invention comprises a molding tool 14 in which a threaded-bolt negative mold cavity 15 in the shape of the threaded bolt to be produced. The molding tool 14 is received in a heating and cooling installation 19 which surrounds the molding tool 14 laterally and on the lower side. The molding tool 14 is assembled from two halves which bear on one another along a vertical separation joint. According to FIG. 1A, the system according to the invention moreover comprises an insert piece 16 having a central through opening in which a blank 17 is disposed.

The threaded-bolt negative mold cavity 15 extends from an opening at the upper end to an end face at the lower end. The end face delimits a first cylindrical portion, the diameter thereof being smaller than the diameter of the blank 17. A second cylindrical portion, the diameter thereof being somewhat larger than the diameter of the blank 17 adjoins the first cylindrical portion. The first cylindrical portion has a smooth shell surface. A threaded structure 18 is configured in the wall of the second cylindrical portion (cf. FIG. 3). The second cylindrical portion transitions into a third portion, the latter widening in a conical manner toward the opening. The first, the second, and the third portion together form the threaded-bolt negative mold in which the threaded bolt has a threadless front portion, a shaft provided with a thread, and a countersunk head.

The insert piece 16 has a protrusion 23 which matches the third portion of the threaded-bolt negative mold and tapers off toward the bottom in a conical manner. If the insert piece 16 is guided toward the molding tool 14 (FIG. 1B), the protrusion 23 of the insert piece 16 fills the third portion of the threaded-bolt negative mold. The central through opening in the insert piece 16 is disposed in the extension of the cylindrical portions of the threaded-bolt negative mold.

The system furthermore comprises a first die 20 and a second die 21 which are conceived for exerting pressure in the axial direction on the rear end of the blank 17. The first die 20 is cylindrical, having a diameter matching the diameter of the through bore in the insert piece 16. The second die 21 is likewise cylindrical, having a diameter which is at least as large as the opening at the upper end of the threaded-bolt negative mold cavity 15. The second die 21 is provided with a heating installation 22 which is conceived for heating the rear portion of the blank 17.

Figure 2:
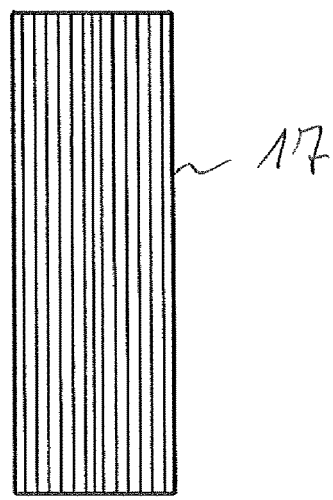
FIG. 2 shows a schematic illustration of a blank.

An enlarged illustration of the blank 17 is shown in FIG. 2. The blank is composed of PEEK having embedded carbon fibers. PEEK is a thermoplastic plastics material with a melting temperature of 335° C. The parallel vertical lines in FIG. 2 that extend in the longitudinal direction of the blank show the preferred direction of the carbon fibers.

The sequence of the method according to the invention is as follows. The insert piece 16 together with the blank 17 which has been inserted into the through opening is heated in an oven (not illustrated) to a temperature of the magnitude of the melting temperature of PEEK. In parallel therewith, the molding tool 14 by way of the heating installation 19 is elevated to a temperature of approximately 400° C. The die 20 is heated to a temperature of approximately 300° C.

The insert piece 16 having the blank 17 disposed therein is guided toward the molding tool 14 such that the protrusion 23 of the insert piece 16 engages in the upper portion of the threaded-bolt negative mold cavity 15. The blank 17 is pushed downward by the first die 20 which is introduced into the through opening of the insert piece 16 such that said blank 17 penetrates into the threaded-bolt negative mold. FIG. 1B shows the state in which the blank 17 is introduced into the negative mold to the extent that the front end face of the blank 17 bears on the shoulder face which delimits the first portion of the threaded-bolt negative mold.

In this state, the system is idle for a time span of 30 seconds, for example, such that the external region of the blank 17 that bears on the 14 is elevated to a temperature beyond the melting temperature of PEEK. Upon termination of this heating phase, the external region of the blank 17 may have a temperature of 380° C., for example. By contrast, the temperature in the core of the blank 17 remains below the melting temperature of PEEK.

The die 20, at a high pressure of 250 MPa, for example, is then guided further forward such that the blank 17 advances up to the end face of the threaded-bolt negative mold. The deformation of the blank 17 that is associated therewith leads to the material of the blank 17 penetrating into the threaded structure of the molding tool 14 such that a threaded structure is created on the external side of the blank.

Figure 3:
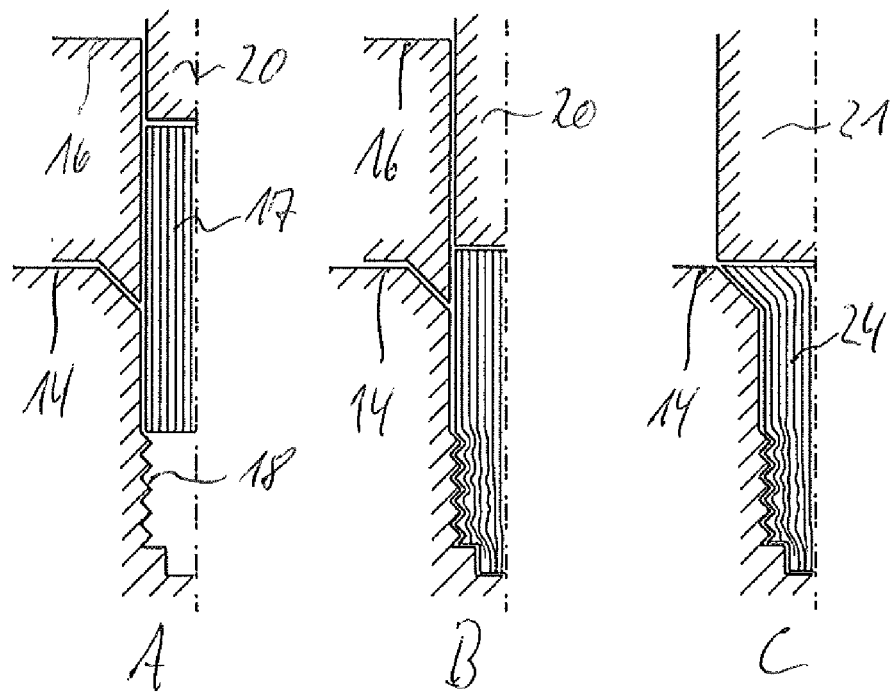
FIG. 3 shows a schematic illustration of the method according to the invention.
Figure 4:
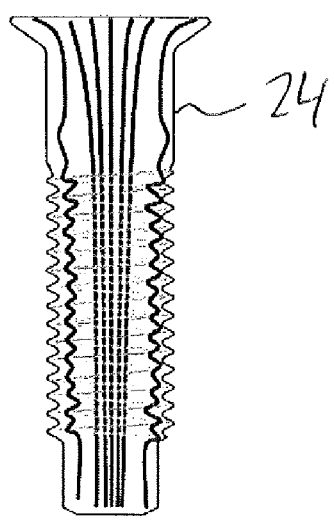
FIG. 4 shows a threaded bolt which has been manufactured by the method according to the invention.

As is shown in FIGS. 3 and 4, the alignment of the carbon fibers in the core region of the structure is substantially maintained in the case of this forming procedure. It is only in the external region in which the thread is formed that the fibers adapt to the threaded structure, the fibers preferably not being severed. The thread which is produced in this manner has very high stability and, at the same time, is of light weight.

Upon the threaded structure having been molded, the first die 20 and the insert piece 16 are removed from the molding tool 14. Instead, the second die 21 which is provided with the heating installation 22 is moved toward the rear-side end face of the blank 17. The second die 21 is heated to a temperature of more than 400° C., enabling the rear portion of the blank 17 to be heated to a temperature above the melting temperature of PEEK by way of contact with the second die 21 (cf. FIG. 1C).

Upon termination of this heating phase, the second die 21 at very high pressure is guided forward such that the rear portion of the blank 17 is deformed, filling the conical region of the threaded-bolt negative mold. In this way, this portion of the blank 17 is formed to a countersunk head of the threaded bolt (cf. FIG. 1D).

Compressed air is subsequently directed into ducts which are configured in the heating and cooling installation 19 of the molding tool 14, so as to cool the molding tool 14. Upon having been sufficiently cooled, the two halves of the molding tool 14 are separated, enabling the finished threaded bolt 24 to be removed from the mold (cf. FIG. 4).

The invention claimed is:

1. A method for producing a threaded bolt comprising:
providing a mold having a cavity including a thread portion defining a threaded structure, said cavity extending axially beyond the thread portion and including an axial end face axially spaced from said thread portion;
providing a blank of plastic material with embedded fibers aligned in a longitudinal direction of a cylindrical portion of said blank, said blank having first and second axial ends, said cylindrical portion having a radial periphery and a core inward of said radial periphery, said plastic material having a melting temperature;
inserting said blank into said cavity so that the first axial end of the blank is axially spaced from said axial end face;
forming a threaded structure on a circumferential face of said cylindrical portion, said step of forming a threaded structure comprising:
heating the radial periphery of said cylindrical portion to a temperature beyond said melting temperature, while a temperature of said core remains below said melting temperature; and
exerting pressure on said blank with a die to deform the blank within the cavity after said step of heating the cylindrical portion, whereby a threaded structure is formed on a circumferential face of said cylindrical portion and said first axial end is deformed to bear on said axial end face;
forming a head of the threaded bolt after forming said threaded structure, said step of forming a head comprising;
heating said second axial end of said blank to a temperature greater than a melting point of said plastic material; and
exerting pressure against said second axial end of said blank after said step of heating said second axial end to form a head of the threaded bolt.

2. The method of claim 1, wherein said step of providing said blank of plastic material comprises providing a blank of thermoplastic material.

3. The method of claim 2, wherein said thermoplastic material is polyetheretherketone (PEEK).

4. The method of claim 1, comprising the step of:
before said step of inserting, heating said blank to a temperature at least 80% of said melting temperature.

5. The method of claim 1, comprising the step of:
before said step of inserting, heating said blank to a temperature at least 90% of said melting temperature.

6. The method of claim 1, comprising the step of:
heating said mold to a temperature that is higher than said melting temperature.

7. The method of claim 1, wherein said step of exerting pressure on the blank comprises:
applying a pressure between 150 MPa and 400 MPa on the blank in a direction aligned with the longitudinal direction of the cylindrical portion of the blank.

8. The method of claim 7, wherein said pressure is between 200 MPa and 300 MPa.

9. The method of claim 1, wherein said step of heating a radial periphery comprises heating a radial depth of said blank beyond a melting point of the plastic material during formation of said threaded structure, and said step of heating said second axial end comprises:
heating an axial extent of the second axial to a temperature greater than a melting point of said plastic material, said axial extent being greater than said radial depth.

10. The method of claim 1, comprising:
filling a region of said cavity corresponding to a head of the threaded bolt with an insert piece surrounding the second end of the blank during formation of said threaded structure;
removing said insert piece before the step of forming a head.

11. The method of claim 10, comprising:
heating the blank along with said insert piece prior to said step of inserting said blank.

12. A threaded bolt manufactured according to the method of claim 1.

* * * * *